United States Patent [19]

Worborschil

[11] 4,354,185

[45] Oct. 12, 1982

[54] DISPLAY SYSTEM FOR LOCALIZING REGIONS IN A MIXED TEXT AND PICTURE DISPLAY

[75] Inventor: Walter Worborschil, Munich, Fed. Rep. of Germany

[73] Assignee: Siemens Aktiengesellschaft, Berlin & Munich, Fed. Rep. of Germany

[21] Appl. No.: 190,234

[22] Filed: Sep. 24, 1980

[30] Foreign Application Priority Data

Sep. 28, 1979 [DE] Fed. Rep. of Germany ....... 2939458

[51] Int. Cl.³ .............................................. G09G 1/16
[52] U.S. Cl. .................................. 340/709; 340/725; 340/731
[58] Field of Search ................ 340/709, 710, 731, 725

[56] References Cited

U.S. PATENT DOCUMENTS

| | | | |
|---|---|---|---|
| 3,576,574 | 4/1971 | Baskin et al. | 340/731 X |
| 3,868,673 | 2/1975 | Mau et al. | 340/709 |
| 4,015,846 | 4/1977 | Runte et al. | 340/725 X |
| 4,228,430 | 10/1980 | Iwamura et al. | 340/709 |
| 4,259,725 | 3/1981 | Andrews et al. | 340/709 |

*Primary Examiner*—David L. Trafton
*Attorney, Agent, or Firm*—Hill, Van Santen, Steadman, Chiara & Simpson

[57] ABSTRACT

A system for localizing a region of a display incorporates a plurality of resettable counters for defining the position and extent of a cursor in two dimensions, such cursor comprising at least two non-parallel lines defining an open frame. Data is set into the counters periodically at the beginning of each frame, or at the beginning of each scanning line, so that the size and shape of the cursor is selectable, as well as its position on the display. When the data is modified during successive time periods, the cursor can be made to progressively reduce its size so as to indicate a point, and/or to progressively change its location.

17 Claims, 4 Drawing Figures

DISPLAY SYSTEM FOR LOCALIZING REGIONS IN A MIXED TEXT AND PICTURE DISPLAY

BACKGROUND

1. Field of the Invention

The present invention relates to a system for the localization of regions is a mixed text-picture display and more particularly to such displays in which information is displayed with two brightness levels.

2. The Prior Art

In connection with the processing of display patterns having mixed text and picture elements, an operator must have aids available which make possible a localization of both the text elements, and elements of the picture. In a case of text processing, such an aid is generally known as a cursor, which is usually in the form of a rectangle.

It is also necessary to have a means for determining the placement of picture elements which do not cover the entire display surface, such as handwriting, sketches and the like.

The term "cursor" refers to a temporary marking on a display screen which emphasizes to a user, in an optical manner, a momentarily important location on the picture. In the case of data display devices, it is for example a dash or a brighter appearance of the character or line which is to be processed next. Such apparatus is described in "Elektronik", 1978, Pamphlet 4, Index Card Number 399.

BRIEF DESCRIPTION OF THE INVENTION

A principal object of the present invention is to provide a novel shape of a cursor by which localization of individual points on the display screen is made possible.

Another object of the present invention is to provide a cursor which is easily recognizable independently on the information presented in the display.

A further object of the present invention is to provide a system for localizing regions in a mixed text-picture display where the display screen presents the information with two brightness levels.

Another object of the present invention is to provide a cursor in the form of a blinking rectangle framing a localized area, or as a blinking angle for locating a point on the display.

The present invention offers the advantage that localized regions are identified and emphasized by means of an alternatingly dark or bright frame surrounding the area to be located, or an alternately dark or bright angle identifying a point to be located.

These and other objects and advantages of the present invention will become manifest by an examination of the following description and the accompanying drawings.

BRIEF DESCRIPTION OF THE DRAWINGS

Reference will now be made to the accompanying drawings, in which.

DESCRIPTION OF THE PREFERRED EMBODIMENT

Figure 1:
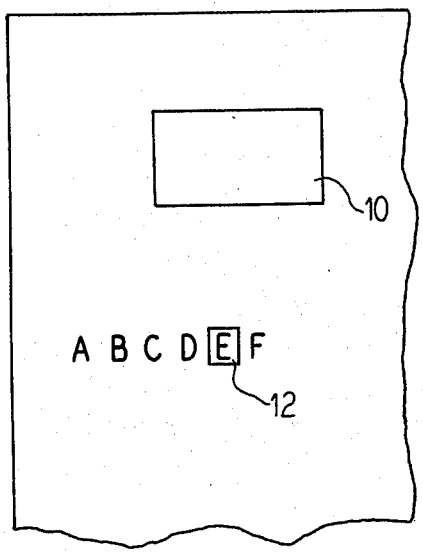
FIG. 1 is a schematic illustration of a cursor as it appears on a display screen, in the form of a rectangular frame.

The cursor of the present invention is illustrated in diagrammatic form in FIG. 1, where it is shown as a rectangular frame 10 for designating a specific location. The size and shape of the rectangular frame 10 may be varied, in order to accommodate different areas and shapes. Also shown in FIG. 1 is a cursor 12 surrounding the letter "E" which serves to locate and emphasize the letter "E". In this case, the cursor assumes the form of a square surrounding the character, with the character visible within the area of the cursor.

Figure 2:
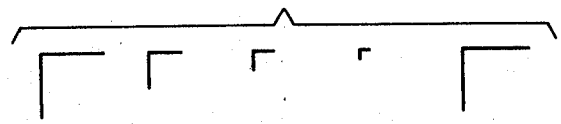
FIG. 2 is a schematic diagram of a cursor having an angle shape and which is reduced in size in a step-by-step manner.

In FIG. 2, the cursor comprises an angle formed with horizontal and vertical lines, which angle is shown at five successive moments, illustrating the manner in which the cursor reduces its size in step-by-step fashion in order to identify a point, corresponding to the cursor in the fourth position shown in FIG. 2. If desired, the position of the cursor may also move relative to the display screen, to approach the point to be located and emphasized on the display.

Figure 4:
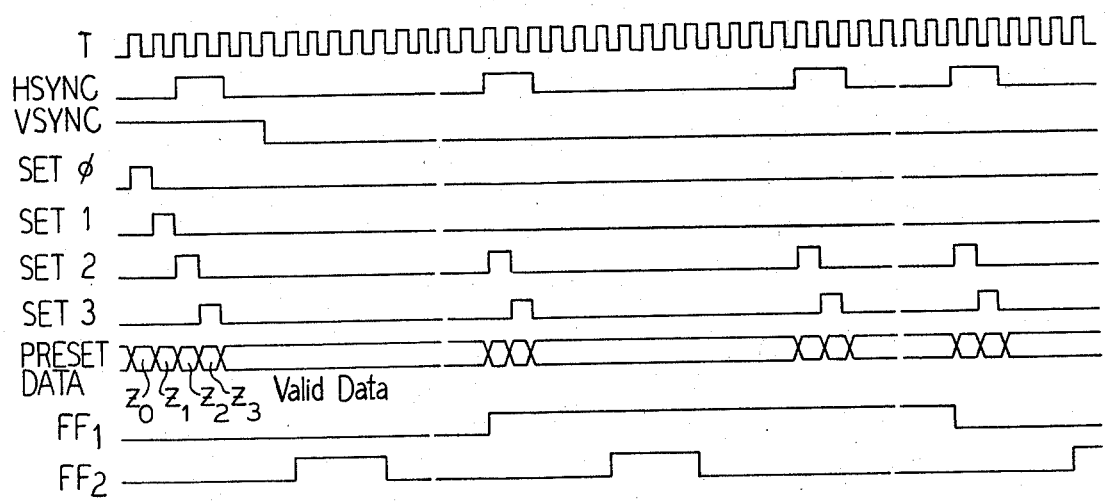
FIG. 4 is a timing diagram for the exemplary circuit arrangement of FIG. 3.
Figure 3:
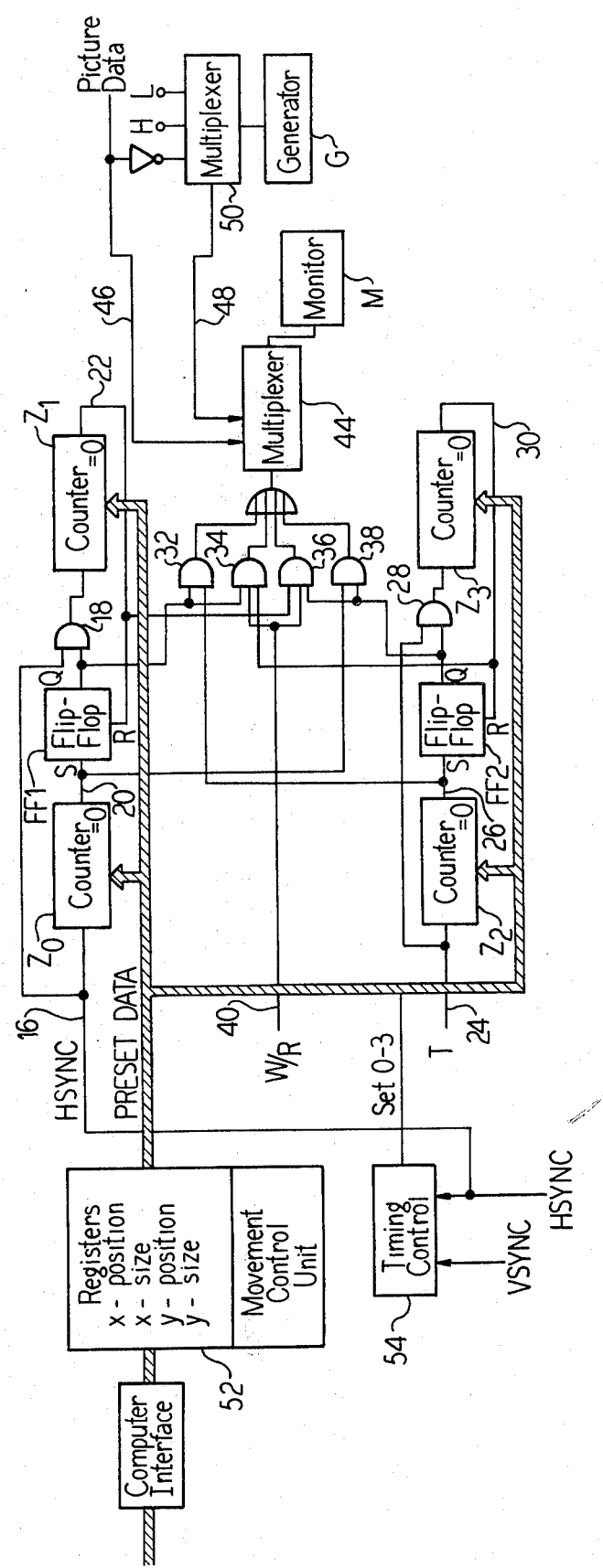
FIG. 3 is a functional block diagram of an exemplary circuit arrangement for realizing the cursor of the present invention.

FIG. 3 illustrates a functional block diagram of apparatus for developing the cursor shapes illustrated in FIGS. 1 and 2. Four presettable counters $Z_0$ through $Z_3$ are employed, which are presettable with a quantity indicative of the location and size of the cursor. The counters $Z_0$ and $Z_1$ are preset with quantities which determine respectively the location and length of the cursor in a direction transverse to a scan line, and the counters $Z_2$ and $Z_3$ are preset with data indicative respectively of the position and length of the cursor in a direction along the scan line. All of the counters are set periodically by logic 54, signals SET 0-3 according to FIG. 4 from a data bus 14, labeled "PRESET DATA SET 0—3" in FIG. 3. The counters $Z_0$ and $Z_1$ are set at the beginning of each frame caused by the signal VSYNC, while the counters $Z_2$ and $Z_3$ are set at the beginning of each line, caused by the signal HSYNC.

The counter $Z_0$ is counted down by sync pulses presented to a line 16 and when it reaches a zero quantity, a flip-flop $FF_1$ is set. Thereafter, the counter $Z_1$ is counted down by pulses from the line 16 passed through the AND-gate 18, which AND-gate is enabled by the Q output of the flip-flop $FF_1$.

Assuming that the display device is scanned with a roster made up of horizontal lines and the scan beginning at the top and continuing downwardly, the counter $Z_0$ produces an output on its output line 20 during the scan line corresponding to the upper border of the cursor 10. The output of the counter $Z_1$, on line 22, is high during the scan line corresponding to the lower border of the cursor 10.

During each scan line, the counter $Z_2$ is counted down by means of clock pulses on a line 24 which occur at a multiple of the scan frequency, and when the counter $Z_2$ reaches zero, an output is produced on its output line 26. The line 26 is connected to the set input of a flip-flop $FF_2$, after which the counter $Z_3$ is counted down by pulses from the line 24 which are passed through an AND-gate 28. When the counter $Z_3$ reaches zero, the flip-flop $FF_2$ is reset. The output on the line 26 corresponds, during each scan line, to the location corresponding to the left-hand border of the cursor 10, and the output of the counter $Z_3$, which appears on line 30, corresponds to the position in each scan line coinciding with the right-hand border of the cursor 10. The Q output from flip-flop $FF_1$ is high during those scanning lines which pass through the cursor 10, and the output of the flip-flop $FF_2$ is high during that portion of each scan line which passes through the area defined by the cursor 10.

The Q output of the flip-flop $FF_1$ is connected to inputs of two AND-gates 32 and 34 and the Q output of the flip-flop $FF_2$ is connected to inputs of two AND-gates 36 and 38. The AND-gate receives a second input from the line 26, the AND-gate 34 receives a second input from the line 30, the AND-gate 38 receives a second input from the line 22, and the AND-gate 38 receives a second input from the line 20. The gates 34 and 36 each receive a third input from a W/R line 40, which controls the mode of the cursor. When the line 40 is high, the cursor appears as a frame, whereas when the line 40 is low, it appears as an angle.

The outputs of the four gates 32–38 correspond respectively to the left, right lower and upper borders of the frame 10. The outputs of all four of these gates are connected as four inputs of an OR-gate 42, which produces a signal connected to a multiplexer unit 44. The multiplexer unit 44 has two input lines 46 and 48 on which are presented respectively picture signals and cursor signals. One of these signals is selected for connection to the monitor unit M, in accordance with the output of the OR-gate 42. When this output is high, the cursor signal is connected to the monitor M, and produces a cursor in the form of a frame or angle having an intensity corresponding to the signal on the line 48. At other times, the picture signal is free to reach the monitor via the line 46 and the multiplexer 44.

It is apparent that the position of the cursor is dependent on the quantities preset into the counters $Z_0$ and $Z_2$ and that the vertical and horizontal dimensions of the cursor are defined by the quantities preset into the counters $Z_1$ and $Z_3$. These quantities can all be determined independently, so as to select any desired size and shape of the rectangle, and to position it anywhere in the display area. Its position and/or size can be varied during successive frames of the display, by changing the quantities which are preset into the counters $Z_0$–$Z_3$ to achieve the desired effect. These quantities are stored in registers X-position, Y-position, X-size, and Y-size, controlled by the computer output, and by a movement control unit 52, such as a joy stick. For example, the decreasing size of the cursor as shown in FIG. 2 is achieved by decreasing the quantity preset into the counters $Z_1$ and $Z_3$ during successive time periods. In order to achieve pulsing, one or both of the counters $Z_0$ and $Z_2$ is set to its maximum count during periods in which no cursor display is desired. Such settings are alternated with settings which correspond to the desired position of the pulse and cursor. In addition, the cursor can be illustrated as moving by periodically changing the quantities preset into the counters $Z_0$ and $Z_2$, depending on whether a vertical or horizontal movement, or both, is desired.

It will be appreciated that the level of the signal on the line 48 is selected to give the cursor a brightness level different from that of the characters of text, and picture elements, so that the characters and picture of the display are not obliterated. A multiplexer 50 can switch three different signals on Line 48; the inverted picture signal on Line 46, a "high" signal and a "low" signal. The generator G controls the sequence of these signals. For example, the cursor signal can be periodically switched from "high" to "low". This causes the cursor to remain visible independently of the displayed information.

In operation, the operator may define the size and position of the rectangular frame cursor by first using the point mode and moving the point-indicating cursor to the point corresponding to the upper left-hand corner of the desired frame position. This movement may be carried out in a well-known manner, using a joy stick or other movement controls 52. This movement is effected by presetting counters $Z_0$ and $Z_2$ with progressively larger or smaller quantities, in dependence on the desired direction of movement left and right, and up and down, under control of the joy stick. When the point cursor reaches the position desired for the upper left-hand corner of the frame cursor, the operator operates a control (not shown) which fixes the quantities preset into the counters $Z_0$ and $Z_2$. Thereafter, the joy stick controls the presetting of the counters $Z_1$ and $Z_3$, with progressively larger (or smaller) quantities, in response to movement of the joy stick in the known manner, which establishes the size and shape of the rectangular frame cursor. The quantities derived in this way, for presetting the counters, may be stored for later use by a program control, which causes the cursor to appear at the selected location and with the selected size, when required.

Although the present invention has been described in the foregoing in terms of a display screen which employs a scanning mechanism for scanning plural parallel lines in succession, it will be apparent that the present invention may be employed in any display system. Various other modifications and additions may be made to the present invention without departing from the essential features of novelty thereof, which are intended to be defined and secured by the appended claims.

What is claimed is:

1. A system for localizing a region of a display device for displaying a mixed text-picture with two brightness levels comprising means for scanning the region to be localized, means for generating a signal representative of an open frame formed by at least two non-parallel lines, means for moving the position of said cursor in two dimensions in the picture of said display device, means for mixing said cursor signal with picture information, means including a data input for controlling the size of said cursor by controlling the length of said lines, whereby the size of said cursor can be modified by modifying said data input, and means for periodically changing the data input for progressively reducing the size of said cursor.

2. Apparatus according to claim 1, wherein said two lines are orthogonal and intersecting.

3. Apparatus according to claim 1, wherein said cursor is formed of four lines in the shape of a rectangle.

4. Apparatus according to claim 1, including means for causing said cursor to alternately appear bright and dark.

5. Apparatus according to claim 1, including means for mixing said cursor signal with picture information so that said picture information appears with normal brightness except for the lines defined in said cursor.

6. Apparatus according to claim 1, including means for pulsing said cursor by periodically removing it from the display.

7. Apparatus according to claim 1, including means for determining the size of the cursor and incorporating means for defining the upper left-hand corner of the cursor and means operated subsequently for determining the size and shape of the cursor.

8. Apparatus according to claim 1, incorporating first and second presettable counters for determining the position and length of the cursor in a direction perpendicular to a scan line, third and fourth counters for determining the position and length of the cursor in the direction along the scan line, and output means controlled by said counters for developing a cursor identification signal only while said cursor is being scanned.

9. Apparatus according to claim 8, including means for presetting said first and second counters during each frame of said display and means for presetting said third and fourth counters at the beginning of each scanning line.

10. Apparatus according to claim 1 including means for changing the data presented to said data input at regular intervals.

11. A method of locating regions on a display screen comprising the steps of generating a cursor in the form of two or more non-parallel lines, positioning said cursor at a location anywhere on said display screen, presenting data to a data input for controlling the length of said lines, whereby the size and shape of said cursor can be modified by modifying said data input, and periodically changing the data input to progressively alter the size of said cursor.

12. A method according to claim 11, including the step of generating a cursor in the form of a rectangle defined by four lines.

13. The method according to claim 11, including the step of periodically changing the data input whereby said cursor progressively reduces its size so as to indicate a point on said display.

14. The method according to claim 11, including the step of periodically changing the data, whereby the location of said cursor moves toward said point on the display.

15. The method according to claim 12, including the step of defining the size and shape of said cursor by first defining the upper left-hand corner of said cursor, and afterwards defining the lower right-hand corner of said cursor, for generating data for controlling the display of said cursor.

16. The method according to claim 12, including the step of using said point mode cursor for locating the position of the cursor surface on said display screen, including the steps of locating a point on said display with said cursor in the point mode and thereafter displaying a cursor surface at a position on said display corresponding to said point.

17. The method according to claim 15, including the step of changing the data presented to said data input at regular intervals.

* * * * *